No. 12,785. REISSUED APR. 28, 1908.
B. F. CAMPBELL.
LUBRICATING DEVICE.
APPLICATION FILED NOV. 12, 1907.
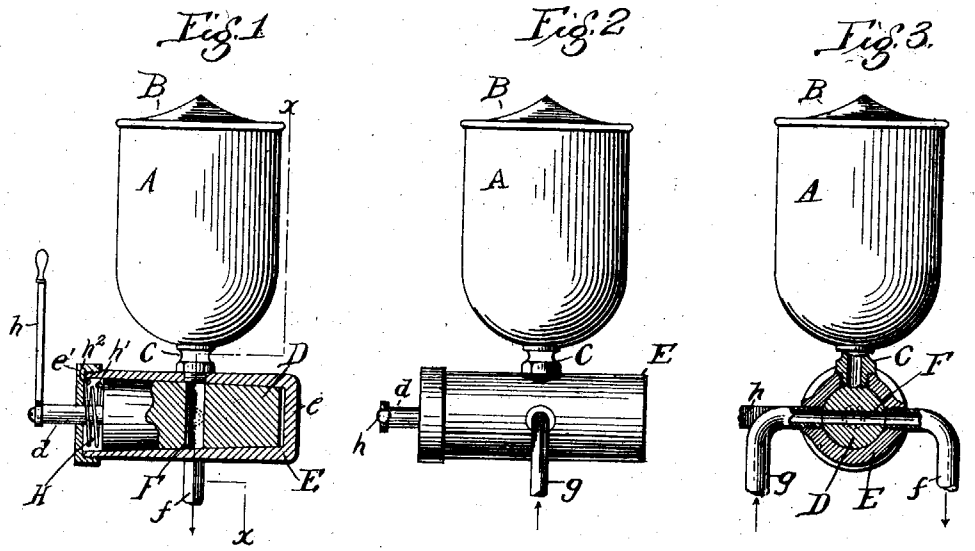
Witnesses
H. C. Stein
Ralph Gunder
Inventor
Benjamin F. Campbell
by Hopkins & Eaton Attys.
THE NORRIS PETERS CO., WASHINGTON, D. C.

UNITED STATES PATENT OFFICE.

BENJAMIN F. CAMPBELL, OF LITTLE ROCK, ARKANSAS, ASSIGNOR, BY DIRECT AND MESNE ASSIGNMENTS, TO CAMPBELL GRAPHITE LUBRICATOR CO., OF LITTLE ROCK, ARKANSAS.

LUBRICATING DEVICE.

No. 12,785. Specification of Reissued Letters Patent. Reissued Apr. 28, 1908.

Original No. 755,741, dated March 29, 1904, Serial No. 191,249. Application for reissue filed November 12, 1907. Serial No. 401,901.

*To all whom it may concern:*

Be it known that I, BENJAMIN F. CAMPBELL, a citizen of the United States, and resident of the city of Little Rock, county of Pulaski, Arkansas, have invented certain new and useful Improvements in Lubricating Devices, of which the following is a specification.

The invention to be hereinafter described relates to lubricating devices of the general type for applying graphite, mica or other character of lubricant to movable parts—as, for instance, the steam chest or cylinder of a steam-engine and their coacting elements; and the object of the present invention is to provide a simple device of this character which will enable a definite charge of lubricant to be forcibly fed to the parts to be lubricated at desired times.

With these general objects in view the invention consists of the parts and combinations, as hereinafter set forth, and more particularly defined in the claims.

In the drawings—Figure 1 is a longitudinal section of a device embodying my present invention, showing parts broken away and the reservoir in elevation. Fig. 2 is a side elevation of the device represented in Fig. 1 with the handle turned to a lower position. Fig. 3 is a transverse section on the line *x x* of Fig. 1, showing reservoir in elevation.

In the drawings, A represents any suitable form of reservoir or lubricant cup having a usual cover B, and extending downward from the reservoir or cup A is the pipe connection C.

Disposed, preferably, below the reservoir or cup A is the valve or plug and its casing, the latter being provided, preferably, with a valve seat or bore tapering from the one end to the other. The casing E may be formed of a single piece of metal, as shown in Fig. 1, which is bored longitudinally of its length to provide a tapering seat for the valve or plug D, which is also correspondingly tapered to fit the seat thus formed. It will be noted that the casing E is preferably not bored its entire length, so that thereby simplicity of construction is secured as an incident of its formation. The opposite end of the casing E from the closed end *e* is provided with the cover or cap *e'*, which may be secured to the end of the casing in any suitable manner, as by screw-threads or the like. Disposed within the casing E is the tapering valve or plug D, having a lubricant-charging chamber F bored or formed diametrically through the plug, as shown. Connected to the casing at suitable points on opposite sides thereof are the pipe connections *g* and *f*, the former leading to a suitable air or other fluid supply and the latter *f*, leading to the steam-chest or other parts to be lubricated.

From the construction thus far described it will be seen that when the plug or valve D is in the position shown in Fig. 1, with the lubricant-charging chamber F of the plug in communication with the pipe connection C, lubricant will by gravity drop into and fill the lubricant-charging chamber F, and when the valve or plug D is in such position the solid walls of the plug interrupt communication between the pipes *g* and *f*. When, for example, the plug or valve D is turned into the position illustrated in Fig. 3, the lubricant-charging chamber F is brought into communication with and alinement between the mouths of the pipes *g* and *f* at which time also the solid walls of the valve or plug D will interrupt communication with the lubricant reservoir or cup A. The parts being in the position described and shown in Fig. 3 if air or other fluid under pressure be introduced through pipe *g* it will force the lubricant in the lubricant-charging chamber F into the pipe *f* and from thence to the parts to be lubricated. As a convenient means for controlling the air or fluid pressure the pipe *g* may lead to a convenient position for the operative—as, for instance, to the cab of a locomotive.

Extending from one end of the plug or valve D is the stem *d*, to which is connected the handle *h*, whereby the valve or plug D may be turned from the position shown in Fig. 1 to the position shown in Fig. 3, and vice versa. It is obvious, of course, that the handle *h* may extend to any convenient position, so as to be in convenient location for manipulation by the operative, and, like the pipe *g*, may extend to the cab of the locomotive, if desired, all as is obvious and well understood.

Disposed between the cap *e'* and the end of the plug G is a spring H, one end of which is connected at *h'* to the end of the valve or plug D, and the other end is connected at $h^2$, with the stationary casing or other stationary part. The function of this spring is twofold. By its expansive force exerted between the cap $e'$ and the end of the plug or valve D, the tapering walls of the plug or valve and casing are maintained in close intimate working contact, and thus form a perfect joint between the plug and its casing. By the positive connection of the spring with the valve D and the casing or stationary part E it will be noted that when the valve or plug D is turned in position to forcibly discharge the lubricant from the lubricant-charging chamber F into and through the pipe $f$ and the handle $h$ is freed that the force of this spring will at once return the plug or valve D to its original position in Fig. 1, thereby cutting off communication between the pipe connections $g$ and $f$ and maintaining the valve in position shown in Fig. 1 to receive a supply of lubricant from the reservoir A.

The operation of the device will be apparent from the above description. For instance, the parts being in the normal position shown by Fig. 1 and it being desired to supply lubricant to the parts to be lubricated the handle $h$, operative from the cab of the locomotive or other convenient position, is turned until the lubricant-charging chamber F is brought into register with and connects the pipes $g$ and $f$, whereupon air or other fluid pressure being introduced into pipe $g$ will force the charge of lubricant into the other pipe $f$ to the parts to be lubricated, whereupon releasing the handle $h$ will permit the spring H to exert its torsional effect and return the valve or plug D to its normal position, (shown in Fig. 1,) the expansive force of the spring at all times holding the plug or valve D properly seated in its casing to form a close joint therewith.

It is obvious, of course, that the details of the construction may be varied somewhat without departing from the invention.

Having described my invention, what I claim, and desire to secure by Letters Patent, is—

1. In a lubricating device, a lubricant reservoir provided with a discharge opening at its bottom, a valve casing communicating with said opening, a valve seated in said casing and having a lubricant-discharging chamber extending therethrough, a pipe for the introduction of air or fluid pressure connected to one side of said casing, a second pipe for the transmission of the charge of lubricant connected to the opposite side of said casing, means for holding the valve with the lubricant-charging chamber in position to receive a supply of lubricant from the reservoir, and means for turning said valve out of communication with said reservoir and into alinement with said pipes to forcibly discharge the charge of lubricant to the parts to be lubricated, substantially as described.

2. In a lubricating device, the combination of a reservoir or cup, a valve-casing connected thereto and provided with a tapering bore, a valve or plug conforming with the bore of the casing and having a lubricant-charging chamber extending therethrough, a pipe for the introduction of air or fluid pressure connected to one side of said casing, a second pipe for transmission of the charge of lubricant connected to the opposite side of said casing, means for holding the plug or valve with the lubricant-charging chamber in position to receive a supply of lubricant and devices for turning said plug or valve to shut off communication between the lubricant-charging chamber and reservoir or cup, and bring the said chamber into register with the said pipes to thereby forcibly discharge a definite supply of lubricant to the parts to be lubricated.

3. In a lubricating device, the combination of a reservoir or cup, a valve-casing connected thereto, and provided with a tapering bore, a valve or plug conforming with the bore of the casing and having a lubricant-charging chamber extending therethrough, a pipe connected to said casing for introducing a blast of air or other fluid, an oppositely-disposed pipe connected to said casing for transmitting the charge of lubricant, means for turning the valve or plug to bring the lubricant-charging chamber into register with said oppositely-disposed pipes, and a spring for returning the valve or plug to its original position when said means is released.

4. In a lubricating device, a lubricant reservoir or cup, a valve-casing connected thereto and having a tapering bore, a valve or plug fitting the bore of the casing and having a lubricant-charging chamber extending therethrough, means for positively turning said valve or plug in the casing and a spring disposed between one end of the casing and valve or plug and connected to said parts, said spring acting to force the valve lengthwise of the casing to form a proper joint between the valve and casing and to return the valve to its original position when the means for positively turning said valve or plug is released.

5. In a lubricating device, a reservoir or cup, a casing having a tapering bore connected thereto, a valve formed with a taper corresponding to the taper of the bore of the casing and provided with a lubricant-charging chamber extending therethrough, a pipe connected to said casing for introducing a blast of air or other fluid, an oppositely-disposed pipe connected to said casing for transmitting the charge of lubricant, a handle for positively turning said valve or plug to close connection between the reservoir or cup and the lubricant-charging chamber, and a spring disposed between one end of the casing and plug or valve to maintain a close joint between said parts, one end of the spring being connected to the valve and the other end to the casing to act by its torsional force to return the valve to its initial position when the handle is released.

In testimony whereof, I have signed my name to this specification, in presence of two subscribing witnesses.

BENJAMIN F. CAMPBELL.

Witnesses:
LOUIS CEYER,
E. C. BURTON.